United States Patent
Schoebel

(10) Patent No.: US 12,240,038 B2
(45) Date of Patent: Mar. 4, 2025

(54) METHOD OF OPERATING AN APPARATUS FOR PRODUCING A THREE-DIMENSIONAL WORK PIECE AND APPARATUS FOR PRODUCING A THREE-DIMENSIONAL WORK PIECE

(71) Applicant: Nikon SLM Solutions AG, Luebeck (DE)

(72) Inventor: André Schoebel, Luebeck (DE)

(73) Assignee: Nikon SLM Solutions AG, Luebeck (DE)

( * ) Notice: Subject to any disclaimer, the term of this patent is extended or adjusted under 35 U.S.C. 154(b) by 59 days.

(21) Appl. No.: 17/928,407

(22) PCT Filed: Jun. 15, 2021

(86) PCT No.: PCT/EP2021/066017
§ 371 (c)(1),
(2) Date: Nov. 29, 2022

(87) PCT Pub. No.: WO2021/259695
PCT Pub. Date: Dec. 30, 2021

(65) Prior Publication Data
US 2023/0201926 A1   Jun. 29, 2023

(30) Foreign Application Priority Data
Jun. 22, 2020 (DE) ............ 10 2020 116 415.7

(51) Int. Cl.
| | | |
|---|---|---|
| *B22F 10/28* | (2021.01) | |
| *B22F 10/366* | (2021.01) | |
| *B22F 10/368* | (2021.01) | |
| *B22F 10/38* | (2021.01) | |
| *B22F 12/49* | (2021.01) | |
| *B29C 64/393* | (2017.01) | |
| *B33Y 10/00* | (2015.01) | |
| *B33Y 30/00* | (2015.01) | |
| *B33Y 50/02* | (2015.01) | |

(52) U.S. Cl.
CPC ............ *B22F 10/28* (2021.01); *B22F 10/366* (2021.01); *B22F 10/368* (2021.01); *B22F 10/38* (2021.01); *B22F 12/49* (2021.01); *B29C 64/393* (2017.08); *B33Y 50/02* (2014.12); *B22F 2999/00* (2013.01); *B33Y 10/00* (2014.12); *B33Y 30/00* (2014.12)

(58) Field of Classification Search
CPC ........ B22F 10/28; B22F 10/30; B22F 10/366; B22F 10/368; B22F 10/38; B22F 12/17; B22F 12/20; B22F 12/30; B22F 12/49; B22F 2207/11; B22F 2999/00; B33Y 10/00; B33Y 30/00; B33Y 50/00; B33Y 50/02; Y02P 10/25; B29C 64/386; B29C 64/393; B29C 64/141; B29C 64/153
See application file for complete search history.

(56) References Cited

U.S. PATENT DOCUMENTS

| | | |
|---|---|---|
| 2016/0271884 A1 | 9/2016 | Herzog |
| 2017/0173883 A1 | 6/2017 | Gray et al. |
| 2020/0023578 A1* | 1/2020 | Edelhäuser ............. B22F 10/28 |
| 2020/0188998 A1 | 6/2020 | Saito |

FOREIGN PATENT DOCUMENTS

| | | |
|---|---|---|
| DE | 102013017792 | 4/2015 |
| DE | 102017207264 | 10/2018 |
| DE | 102018202506 | 8/2019 |
| EP | 3023227 | 5/2016 |
| EP | 3695923 | 8/2020 |
| JP | 2004306612 | 11/2014 |

(Continued)

OTHER PUBLICATIONS

Abdelrahman Mostafa et al: "Quality certification and control of polymer laser sintering: layerwise temperature monitoring using thermal imaging", The International Journal Of Advanced Manufacturing Technology, vol. 84 no. 5, pp. 831-842, Sep. 4, 2015.
European Patent Office, International Search Report and Written Opinion for International Patent Application No. PCT/EP2021/066017, Sep. 22, 2021.
German Patent and Trademark Office, German Search Report for DE 10 2020 116 415.7, Mar. 22, 2021.
Japanese Patent Office, JP Examination Report for International Patent Application No. JP2022-578810, Feb. 7, 2024.

*Primary Examiner* — Philip C Tucker
*Assistant Examiner* — Jimmy R Smith, Jr.
(74) *Attorney, Agent, or Firm* — Williams Mullen; Thomas F. Bergert

(57) ABSTRACT

A method of operating an apparatus (10) for producing a three-dimensional work piece (18) by irradiating layers of a raw material powder with electromagnetic or particle radiation comprises the steps of a) applying a layer of raw material powder onto a carrier (12); b) selectively irradiating the layer of raw material powder with electromagnetic or particle radiation in accordance with a geometry of a corresponding layer of the work piece (18) to be produced; and c) repeating steps a) and b) until the work piece (18) has reached the desired shape and size. For at least a portion of at least some of the layers, a scanning time ($t_s$) from the beginning of the exposure of a respective raw material powder layer portion to electromagnetic or particle radiation until the beginning of the exposure of a new raw material powder layer applied on top of said layer portion to electromagnetic or particle radiation is controlled so as to not fall below a specific minimum value which is individually set for said layer portion in dependence on a layer portion specific quality parameter. layer portion specific quality parameter.

8 Claims, 4 Drawing Sheets

(56) References Cited

FOREIGN PATENT DOCUMENTS

Figure 2A:
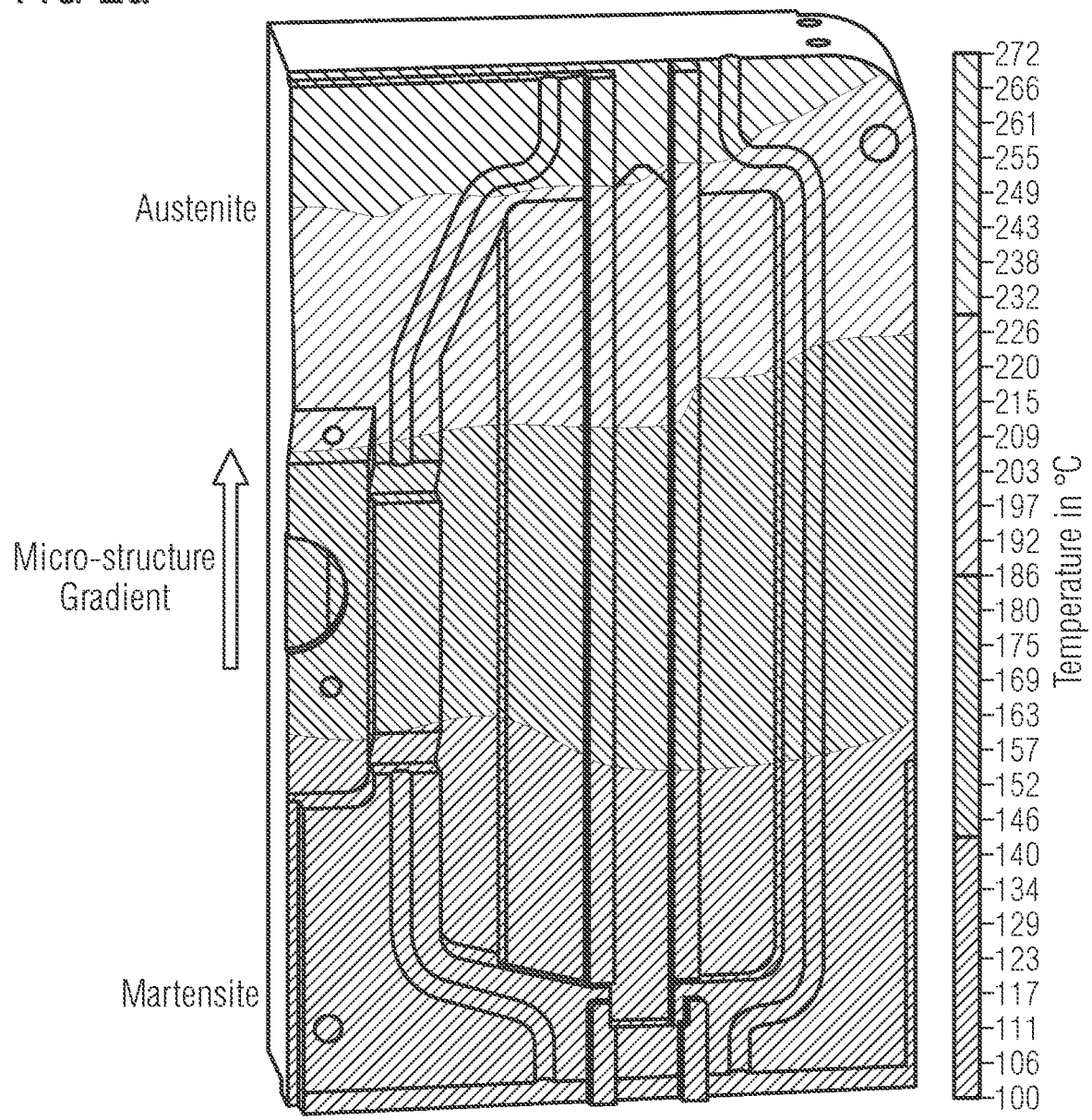

| | | |
|---|---|---|
| JP | 2019044210 | 3/2019 |
| JP | 2020094250 | 6/2020 |

\* cited by examiner

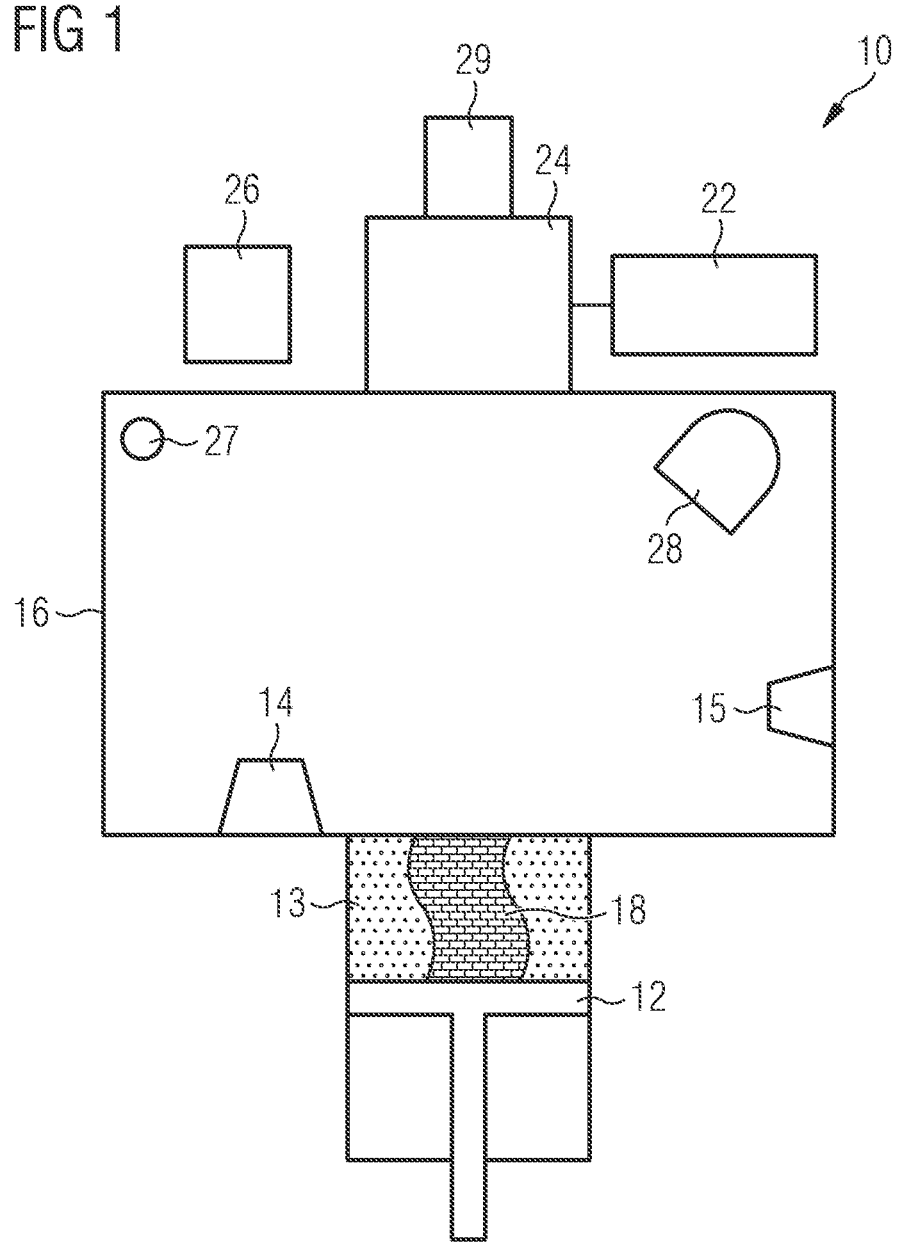

METHOD OF OPERATING AN APPARATUS FOR PRODUCING A THREE-DIMENSIONAL WORK PIECE AND APPARATUS FOR PRODUCING A THREE-DIMENSIONAL WORK PIECE

CROSS-REFERENCE TO RELATED APPLICATIONS

This application is the U.S. national phase of international application PCT/EP2021/066017, filed on Jun. 15, 2021, which claims the benefit of German application DE 10 2020 116 415.7 filed on Jun. 22, 2020; all of which are hereby incorporated herein in their entireties by reference.

The invention is directed to a method of operating an apparatus for producing a three-dimensional work piece by irradiating layers of a raw material powder with electromagnetic or particle radiation and to an irradiation system. Further, the invention is directed to an apparatus for producing a three-dimensional work piece.

Powder bed fusion is an additive layering process by which pulverulent, in particular metallic and/or ceramic raw materials can be processed to three-dimensional work pieces of complex shapes. To that end, a raw material powder layer is applied onto a carrier and subjected to laser radiation in a site selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. Powder bed fusion may be employed for the production or repairing of prototypes, tools, replacement parts, high value components or medical prostheses, such as, for example, dental or orthopaedic prostheses, on the basis of CAD data.

An exemplary apparatus for producing three-dimensional work pieces by powder bed fusion as described in EP 3 023 227 B1 comprises a process chamber accommodating a powder application device for successively applying layers of a raw material powder onto a carrier. An irradiation unit is provided for selectively irradiating a laser beam across the raw material powder layers.

Upon building up a three-dimensional work piece on the carrier of a powder bed fusion apparatus, the dissipation of heat from currently irradiated layers may become more difficult with increasing build height of the work piece. This may cause the development of a thermal gradient within the work piece and consequently affect the quality of the work piece. Undesired effects which may deteriorate the overall quality of the work piece may also arise if the geometry of the work piece requires abrupt changes of the area to be irradiated, the so-called exposure area, between adjacent layers.

It is an object of the present invention to provide a method of operating an apparatus for producing a three-dimensional work piece by irradiating layers of a raw material powder with electromagnetic or particle radiation and an apparatus for producing a three-dimensional work piece by irradiating layers of a raw material powder with electromagnetic or particle radiation which allow an efficient production of high-quality work pieces.

In a method of operating an apparatus for producing a three-dimensional work piece by irradiating layers of a raw material powder with electromagnetic or particle radiation a layer of raw material powder is applied onto a carrier. For applying the raw material powder onto a surface of the carrier, a powder application device which is moved across the carrier so as to distribute the raw material powder may be used. The carrier and the powder application device may be accommodated within a process chamber which is sealable against the ambient atmosphere. The raw material powder applied onto the carrier within the process chamber is preferably a metallic powder, in particular a metal alloy powder, but may also be a ceramic powder or a powder containing different materials. The powder may have any suitable particle size or particle size distribution. It is, however, preferable to process powders of particle sizes <100 µm.

The layer of raw material powder is selectively irradiated with electromagnetic or particle radiation in accordance with a geometry of a corresponding layer of the work piece to be produced. An irradiation device for selectively irradiating electromagnetic or particle radiation onto the raw material powder on the carrier may comprise a radiation beam source, in particular a laser beam source, and additionally may comprise an optical unit for guiding and/or processing a radiation beam emitted by the radiation beam source. The optical unit may comprise optical elements such as an object lens and a scanner unit, the scanner unit preferably comprising a diffractive optical element and a deflection mirror.

The steps of applying a layer of raw material powder onto the carrier and selectively irradiating the layer of raw material powder with electromagnetic or particle radiation in accordance with a geometry of a corresponding layer of the work piece to be produced are repeated until the work piece has reached the desired shape and size. The carrier may be a rigidly fixed. Preferably, however, the carrier is designed to be displaceable in vertical direction, so that, with increasing construction height of the work piece, as it is built up in layers from the raw material powder, the carrier can be moved downwards in the vertical direction.

For at least a portion of at least some of the layers, a scanning time from the beginning of the exposure of a respective raw material powder layer to electromagnetic or particle radiation until the beginning of the exposure of a new raw material powder layer on top of said layer portion to electromagnetic or particle radiation is controlled so as to not fall below a specific minimum value. In particular, an exposure time, a waiting time, and a raw material powder application time are controlled such that the scanning time which is defined by the equation:

$$\text{scanning time } (t_s) = \text{exposure time } (t_e) + \text{waiting time } (t_w) + \text{raw material powder application time } (t_p)$$

does not fall below a specific minimum value. The exposure time is defined as a time period during which the raw material powder layer portion is exposed to electromagnetic or particle radiation. The waiting time is defined as a time period during which the raw material powder layer portion is not exposed to electromagnetic or particle radiation while the application of a new raw material powder layer portion on top of said layer has not yet begun. The raw material powder application time is defined as a time period during with a new raw material powder layer is applied on top of said layer portion.

Thus, for controlling the scanning time for a respective raw material powder layer portion, the exposure time, the waiting time and the raw material powder application time are taken into account. In general, the exposure time, the waiting time and the raw material powder application time may assume any desired value including zero. In dependence on the exposure time and the raw material powder application time, a waiting time may be required for obtaining a desired scanning time or not. Thus, the provision of a waiting time may be optional.

Specifically, for adapting the scanning time for a respective raw material powder layer portion, either the exposure time or the waiting time or the raw material powder application time may be changed. It is, of course, also possible to change more than one of the exposure time and the waiting time and the raw material powder application time to adapt the scanning time as desired, for example so as to correspond to the minimum scanning time. For example, the exposure time may be extended by reducing a scan speed of the irradiation beam, increasing the number of vectors of the irradiation pattern, in other words increasing the length of the irradiation path, or in the case of using multiple irradiation beams using only few. The waiting time may, for example, be implemented or extended by deferring the start of the application of a new raw material powder layer and/or deferring the start of the exposure after the application of a new raw material powder layer. The raw material powder application time for example may be extended by slowing down the moving speed of the powder application device, adding the new powder layer in multiple sub layers or doing additional passages over the powder bed without adding additional powder, e.g. for compressing and evening the powder layer. In the meaning of the invention, the time while the powder application device is doing additional passages is understood as part of the raw material powder application time.

The exposure time may be a single time period which starts when the selective irradiation of the raw material powder layer portion is started and which ends when the corresponding work piece layer portion has been generated within the raw material powder layer. The waiting time may be a single time period which starts immediately after the end of the exposure time and lasts until the start of the application of a new raw material powder layer. It is, however, also conceivable that the exposure time comprises a plurality of exposure time intervals during which the raw material powder layer portion is exposed to electromagnetic or particle radiation. These exposure time intervals may be interrupted and/or followed by respective waiting time intervals.

The specific minimum value of the scanning time, i.e. the minimum scanning time is individually set for said layer portion in dependence on a layer portion specific quality parameter. In other words, in the method of operating an apparatus for producing a three-dimensional work piece, the minimum scanning time is individually set for individual layer portions in dependence on a quality parameter which is layer portion specific and hence may vary from layer portion to layer portion. Consequently, also the minimum scanning time may vary from layer portion to layer portion.

Of course, it is possible, that the layer portion specific quality parameter is equal over a number of layers, especially all layers, and the quality parameter can be equal for all layer portions, i.e. all areas of exposure. Due to various influences on the process the minimum scanning time may vary from layer portion to layer portion to achieve an equal specific quality parameter.

A respective layer portion could be a predetermined part of the layer with fixed coordinates in the plane of the build field, i.e. with a fixed size and position. It is also possible that a respective layer portion is determined in dependence of the shape of a work piece to be produced, especially in dependence of the cross-section of the work piece in the current layer; therefore the size and position of the respective layer portion may vary from layer to layer. The respective layer portion could also be determined to comprise the entire layer. Of course, a layer may comprise more than one respective layer portions, e.g. if more than one work pieces are nested in one build job; in this case it is understood that the minimum scanning time could be set for each respective layer portion, groups of respective layer portions, e.g. in a specific local correlation, or all respective layer portions, i.e. the entire layer.

The layer portion specific quality parameter is a parameter which is indicative of the quality of the work piece layer portion to be produced. For example, the layer portion specific quality parameter may be suitable to indicate that the work piece layer portion is free of material defects, has a desired size and dimension, has a desired microstructure, has a desired crystallographic structure (for example an austenitic structure, a martensitic structure or, in dependence on the type of the raw material powder any other crystallographic structure or material phase), etc. The minimum scanning time is a scanning time which is long enough to ensure that the work piece layer portion can be produced with the desired quality.

By individually adjusting the minimum scanning time for individual layer portions, variations or uniformity of the layer portion specific quality parameter from layer portion to layer portion can be taken into account. Thus, each layer portion can be produced in a manner so as to ensure the desired quality. At the same time, an efficient production of the work piece is made possible, since the minimum scanning time can be set for each layer portion so as to be long enough to ensure that the work piece layer portion can be produced with the desired quality, but not longer. For example, for an individual layer portion, for which the layer portion specific quality parameter indicates that the desired quality can be achieved if the layer portion is scanned with the envisaged scanning time resulting from the geometry of the work piece layer portion to be produced and the operating parameters of the irradiation device such as the scan speed, the spot size and the power of the irradiation beam, prolonging the scanning time can be dispensed with. If, however, for an individual layer portion, the layer portion specific quality parameter indicates that the desired quality cannot be achieved if the layer portion is scanned with the envisaged scanning time resulting from the geometry of the work piece layer portion to be produced and the operating parameters of the irradiation device, the scanning time can be prolonged to the minimum scanning time.

The layer portion specific quality parameter and/or the minimum scanning time may be determined, for at least a portion of at least some of the layers of the work piece to be produced, prior to starting the production of the three-dimensional work piece. For example, the layer portion specific quality parameter and/or the minimum scanning time may be determined for a layer portion of interest based on geometry data indicative of the overall geometry of the work piece to be produced and/or the geometry of the layer portion of interest. In addition, for determining the layer portion specific quality parameter and/or the minimum scanning time, the location of the layer portion of interest within the work piece in a vertical direction may be taken into account. Further, an envisaged scanning time and/or exposure time for the layer portion of interest which results from the geometry of the layer portion of interest and the envisaged operating parameters of the irradiation device may be taken into account. For example, the layer portion specific quality parameter and/or the minimum scanning time may be determined prior to starting the production of the three-dimensional work piece, for each layer portion of interest, by means of a preferably computer-aided simulation.

Alternatively or additionally thereto, the layer portion specific quality parameter may be determined, for at least a portion of at least some of the layers of the work piece to be produced, in situ during the production of the three-dimensional work piece. For example, the layer portion specific quality parameter may be monitored by means of a suitable sensor device.

In a preferred embodiment, the layer portion specific quality parameter is indicative of a temperature of a respective layer portion at a predetermined time such that the scanning time is controlled in dependence on the temperature of the respective layer portion at the predetermined time. In other words, the temperature of a respective layer portion at a predetermined time may be used as a control parameter which is determined either prior to starting the production of the three-dimensional work piece or in situ during the production of the three-dimensional work piece and the scanning time then is controlled in dependence on the determined temperature. In one embodiment, the layer portion specific quality parameter is indicative of a temperature of a respective layer portion at the end of the scanning time.

With increasing height of a work piece, heat dissipation from the work piece layer portions after scanning becomes more and more difficult. Thus, during the production of a work piece with a large vertical height, a thermal gradient may develop within the work piece, i.e. layer portions in an upper part of the work piece may not cool down as desired during the regular process of scanning the layer portion and applying a new raw material powder layer and top of the scanned layer portion.

In an alternative embodiment, the layer portion specific quality parameter is indicative of a temperature of a respective layer portion before the application of a new raw material powder layer.

The specific minimum value of the scanning time may be set such that the temperature of the respective layer portion at the end of the scanning time does not exceed a predetermined maximum value. Prolonging the scanning time and thus the time until the next raw material powder layer is applied on top of the respective layer portion allows the respective layer portion to cool down as desired. Consequently, the development of a thermal gradient within the work piece during the production of the work piece can be avoided or limited to a predetermined permissible range. For ensuring that that the temperature of the respective layer portion at the end of the scanning time does not exceed a predetermined maximum value, it is in particular preferable to prolong the scanning time until the specific minimum value by selecting a suitable waiting time while keeping the exposure time constant. During the waiting time, no further heat is introduced into the work piece allowing the previously produced layer portion to cool to the desired temperature. It is, however, also conceivable to prolong the exposure time or to prolong both the exposure time and the waiting time.

For the adjustment of the scanning time and in particular the determination of a suitable waiting time other parameters of the process may be taken into consideration, like for example the total value or relative value or average value of the power of the radiation received from the layer portion, the number of irradiation beams used simultaneously, the area of exposure within the layer portion, the length of the path of the irradiation beam within the layer portion, the duration of exposure of the layer portion, the temperature at one or more specific points of the process chamber, the temperature of the carrier, the temperature of one or more specific points of the build area, an average temperature of the layer portion, a value of radiation emitted from the build area, a value of radiation emitted from the layer portion, a value of radiation emitted of an area containing the focus point of a radiation beam, a value of thermal expansion of the build area, a temperature of a process gas supplied to the layer portion, a temperature of a process gas drawn off the layer portion or a composition of the process gas, the temperature, quantity and speed of a process gas, or the power of a heater or cooler, e.g. in the process chamber or next to the carrier or within the carrier, just to name some.

Of course, beside the adjustment of the minimum scanning time the above stated parameters and further parameters may be adjusted and the adjustment may be considered for the adjustment of the scanning time, in particular the determination of a suitable waiting time A further option for influencing the layer portion specific quality parameter is the selection of the scanning strategy. Especially when the powder bed fusion apparatus comprises more than one irradiation beams and/or the layer comprises more than one respective layer portion, e.g. when several work pieces are nested in the build job, there may be a difference between irradiating the more than one layer portions simultaneously, grouped simultaneously or one after another. In a preferred embodiment the maximum number of simultaneously irradiated layer portions equals the number of available irradiation beams, in other words when an irradiation beam begins irradiating a first layer portion it will not start irradiation in another layer portion until all areas to be exposed to the irradiation are irradiated. So in the case of several work pieces a preferred embodiment first irradiates all areas belonging to one work piece before irradiating a second work piece. For the selection of the scanning strategy, also the number, size and location of the layer portions may be taken into account. In a preferred embodiment, the irradiation sequence of the layer portions may be determined to avoid or at least limit temperature gradients between the layer portions and/or inside the layer. In an alternative embodiment, the irradiation sequence of the layer portions may be determined to let the first irradiated layer portions cool down a bit before irradiating neighbouring layer portions.

It is possible that a powder bed fusion apparatus is designed for simultaneous irradiation of a part of the powder bed and applying new raw material powder to another part of the powder bed. Due to the method only determining the minimum scanning time for a layer portion the method may be used accordingly.

The specific minimum value of the scanning time may be set such that the respective layer portion has a desired crystallographic structure at the end of the scanning time. This may be achieved by suitably controlling the cooling rate for the respective layer portion. For example, the minimum scanning time may be set such that a transformation from an austenitic to martensitic crystallographic structure is made possible within a layer portion during the scanning time, i.e. until a new raw material powder layer is applied on top of the respective layer portion. This may, for example, be achieved by ensuring that the temperature of the respective layer portion at the end of the scanning time does not exceed a value relating to a structural transformation, like for example 200° C. for most maraging steels. Most preferred but not limiting materials for use with the described method are steels with a martensitic structural transformation, e.g. 1.2709, 17-4PH or M789; the preferred temperature value at the end of the scanning time lies below the transformation temperature.

Other alloys and materials also comprise transformations in the crystallographic structure, the preferred temperature value at the end of the scanning time may therefor lie in a predetermined range based on the material properties where no transformation occurs. The temperature value therefore may not only be limited to a maximum value but also to a minimum value. Therefore, also an additional maximum scanning time may be determined. Typical temperature limits are material based and lie in a range of 100° C. to 800° C. In a preferred embodiment, the measured temperature of a specific point of the layer portion or the average temperature over the layer portion at a predetermined time in the scanning time, e.g. at the end of the scanning time, lies in a range of less than 60°, e.g. between 150° C. and 210° C., especially preferred in a range of less than 30° C., e.g. 175° C. and 205° C. It should be noted that the minimum scanning time can also ensure heating up of the layer portion, e.g. when the powder bed fusion apparatus comprises a heater. Even when a material comprises no structural transformation it was found that controlling the minimum scanning time to reach a predetermined temperature value range in the layer portion improves quality of the work piece.

The layer portion specific quality parameter may be indicative of an abrupt exposure area change between at least a portion of a respective layer and at least a portion of an adjacent layer. The layer portion specific quality parameter then may easily be determined based on the geometry data of the work piece to be produced. Abrupt changes in exposure area and hence exposure time in at least portions of adjacent layers may cause undesired effects, for example the development of horizontal lines, in the work piece to be produced. It is thus preferable to avoid abrupt exposure area/exposure time changes from layer portion to layer portion.

The layer portion specific quality parameter alternatively or additionally may be indicative of an abrupt change in the power of the radiation received from the layer portion, of a change in the layer thickness or of a change of a proportion of a raw material powder material when using more than one materials. When more than one respective layer portions are present in a layer, changes of specific portions could cancel each other out from a view of the complete layer or layer portion groups. When layer portions are grouped for determination, this has to be considered.

The specific minimum value of the scanning time may be set such that a difference in the scanning time between at least portions of adjacent layers does not exceed a predetermined maximum value. For ensuring that that the difference in the scanning time does not exceed a predetermined maximum value, it is in particular preferable to prolong the scanning time until the specific minimum value by selecting a suitable exposure time while keeping the waiting time constant. A continuous increase of the exposure time and a continuous decrease of the exposure time instead of an abrupt change of the exposure time avoids undesired effects, such as the development of horizontal lines in the work piece.

Basically, only one layer portion specific quality parameter needs to be used in the herein described method of operating an apparatus for producing a three-dimensional work piece. It is, however, also conceivable to control the scanning time in dependence on more than one layer portion specific quality parameter. For example, the scanning time may be controlled such that the temperature of the respective layer portion at the end of the scanning time does not exceed a predetermined maximum value and such that a difference in the scanning time between at least portions of adjacent layers does not exceed a predetermined maximum value.

An apparatus for producing a three-dimensional work piece by irradiating layers of a raw material powder with electromagnetic or particle radiation comprises a powder application device for applying a layer of raw material powder onto a carrier. The apparatus further comprises an irradiation device for selectively irradiating the layer of raw material powder with electromagnetic or particle radiation in accordance with a geometry of a corresponding layer of the work piece to be produced. Moreover, the apparatus comprises a control device which is adapted to control the powder application device and the irradiation device so as to apply layers of raw material powder and irradiate the layers of raw material powder with electromagnetic or particle radiation until the work piece has reached the desired shape and size. The control device is adapted to control, for at least a portion of at least some of the layers, an exposure time being defined as a time period during which said layer portion is exposed to electromagnetic or particle radiation, a waiting time being defined as a time period during which said layer portion is not exposed to electromagnetic or particle radiation and while no new raw material powder layer on top of said layer portion is applied, and a raw material powder application time being defined as a time period during which a new raw material powder layer is applied on top of said layer portion such that a scanning time from the beginning of the exposure of a respective raw material powder layer portion to electromagnetic or particle radiation until the beginning of the exposure of a new raw material powder layer applied on top of said layer portion to electromagnetic or particle radiation which is defined by the equation:

$$\text{scanning time } (t_s) = \text{exposure time } (t_e) + \text{waiting time } (t_w) + \text{raw material powder application time } (t_p)$$

does not fall below a specific minimum value which is individually set for said layer portion in dependence on a layer portion specific quality parameter.

The control device may be adapted to control the scanning time in dependence on a layer portion specific quality parameter and/or a minimum scanning time which is/are determined prior to starting the production of the three-dimensional work piece and/or in situ during the production of the three-dimensional work piece.

The layer portion specific quality parameter may be indicative of a temperature of a respective layer portion at the end of the scanning time such that the control device may be adapted to control the scanning time in dependence on the temperature of the respective layer portion at the predetermined time. The control device may be adapted to set the specific minimum value of the scanning time such that the temperature of the respective layer portion at the end of the scanning time does not exceed a predetermined maximum value. Alternatively or additionally, the control device may be adapted to set the specific minimum value of the scanning time such that the respective layer portion has a desired crystallographic structure at the end of the scanning time.

The layer portion specific quality parameter may be indicative of an abrupt exposure area change between at least a portion of a respective layer and at least a portion of an adjacent layer. The control device may be adapted to set the specific minimum value of the scanning time such that a difference in the scanning time between adjacent layer portions does not exceed a predetermined maximum value.

Figure 3A:
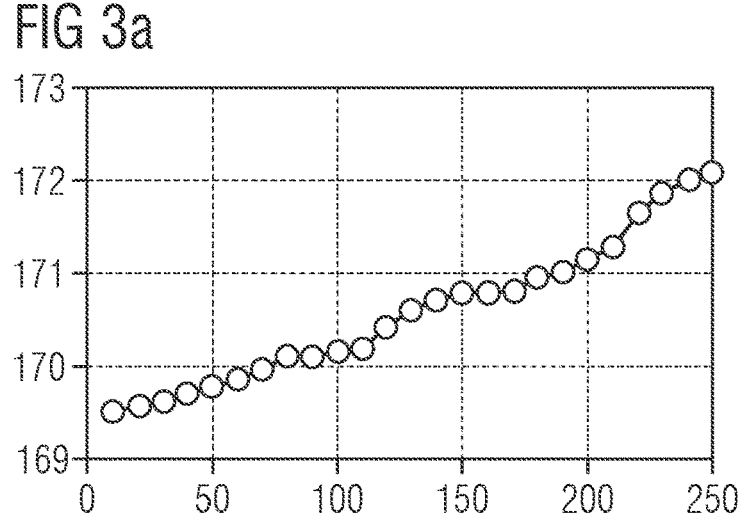
Figure 4:
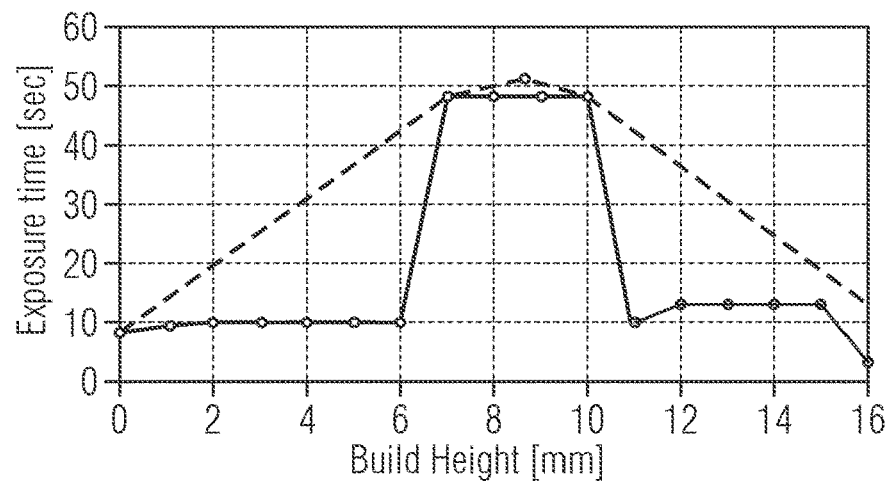

Preferred embodiments of the invention will be described in greater detail with reference to the appended schematic drawings, wherein FIG. 1 shows an apparatus for producing a three-dimensional work piece by irradiating layers of a raw material powder with electromagnetic or particle radiation;

FIGS. 2a and b show the influence of a control of a scanning time in dependence on a layer portion specific quality parameter on the microstructure of a work piece produced by means of the apparatus according to FIG. 1;

FIGS. 3a and b show the influence of a control of a scanning time in dependence on a layer portion specific quality parameter on the dimensions of a work piece produced by means of the apparatus according to FIG. 1; and FIG. 4 shows a diagram indicating a development of an exposure time over a build height with and without consideration of a layer portion specific quality parameter.

FIG. 1 shows an apparatus 10 for producing a three-dimensional work piece by an additive layering process. The apparatus comprises a carrier 12 and a powder application device 14 for applying a raw material powder onto the carrier 12. The carrier 12 and the powder application device 14 are accommodated within a process chamber 16 which is sealable against the ambient atmosphere. An internal atmosphere is established with a shielding gas supplied by a process gas inlet 15, the machine also comprises an process gas outlet not shown. Process gas may be circulated from the outlet to the inlet 15, thereby cooled or heated. The carrier 12 is displaceable in a vertical direction into a built cylinder 13 so that the carrier 12 can be moved downwards with increasing construction height of a work piece 18, as it is built up in layers from the raw material powder on the carrier 12. The carrier can comprise a heater and/or a cooler.

The apparatus 10 further comprises an irradiation device 20 for selectively irradiating electromagnetic or particle radiation onto the raw material powder applied onto the carrier 12. The irradiation device 20 comprises a radiation beam source 22, in particular a laser beam source, and an optical unit 24 for guiding and processing a radiation beam emitted by the radiation beam source 22. A control device 26 is provided for controlling the operation of the apparatus 10 and in particular the operation of the powder application device 14 and the irradiation device 20.

Finally, the apparatus 10 is equipped with several sensor devices. A first sensor device 27 is adapted for measuring the temperature of the atmosphere inside the process chamber 16. A second sensor device 28 is adapted to detect the temperature of raw material powder/work piece layer during and after being irradiated with electromagnetic or particle radiation. The sensor device 28 may, for example, be designed in the form of a suitable camera which is adapted to detect infrared radiation resolved to several locations on the raw material layer. In another exemplary embodiment the sensor device 28 may be a pyrometer device that may detect a temperature at a specific point inside the process chamber 16, e.g. on the raw material layer, or an average temperature over an area inside the process chamber 16, e.g. on the raw material layer. A third sensor device 29 is adapted for detecting radiation emitted from the raw material layer in the focus point of the radiation beam emitted by the radiation beam source 22 and/or in an area around the focus point. The sensed radiation is guided through the optical unit 24 to the third sensor device 29. In a preferred exemplary embodiment the carrier 12 comprises an further fourth sensor device not shown for measuring the temperature of the carrier. The apparatus 10 may comprise further sensor devices, for example for measuring the temperature of a process gas at the process gas inlet 15 or another location, or for measuring the composition of the process gas inside the process chamber 16. It is understood, that this example is not limiting and an apparatus according to the invention may comprise only few of the named sensors or all of them and may comprise further sensors.

During operation of the apparatus 10 for producing a three-dimensional work piece, a layer of raw material powder is applied onto the carrier 12 by means of the powder application device 14. In order to apply the raw material powder layer, the powder application device 14 is moved across the carrier 12 under the control of the control unit 26. Then, again under the control of the control unit 26, the layer of raw material powder is selectively irradiated with electromagnetic or particle radiation in accordance with a geometry of a corresponding layer of the work piece 18 to be produced by means of the irradiation device 20. The steps of applying a layer of raw material powder onto the carrier 12 and selectively irradiating the layer of raw material powder with electromagnetic or particle radiation in accordance with a geometry of a corresponding layer of the work piece 18 to be produced are repeated until the work piece 18 has reached the desired shape and size.

A scanning time for a respective raw material powder, i.e. a time period from the beginning of the exposure of at least a portion of a respective raw material powder layer to electromagnetic or particle radiation until the beginning of the exposure of a new raw material powder layer applied on top of said layer portion to electromagnetic or particle radiation is defined by the equation:

$$\text{scanning time } (t_s) = \text{exposure time } (t_e) + \text{waiting time } (t_w) + \text{raw material powder application time } (t_p)$$

The exposure time is defined as a time period during which the raw material powder layer portion is in fact exposed to electromagnetic or particle radiation. The waiting time is defined as a time period during which the raw material powder layer portion is not exposed to electromagnetic or particle radiation and while no new raw material powder layer is applied on top of said layer. The raw material powder application time is defined as a time period during with a new raw material powder layer is applied on top of said layer portion.

For at least a portion of at least some of the raw material powder/work piece layers, the scanning time from the beginning of the exposure of a respective raw material powder layer portion to electromagnetic or particle radiation until the beginning of the exposure of a new raw material powder layer applied on top of said layer portion to electromagnetic or particle radiation is controlled by means of the control device 26 so as to not fall below a specific minimum value. Specifically, the exposure time, the waiting time, and the raw material powder application time are controlled such that the scanning time does not fall below the specific minimum value. The specific minimum value of the scanning time, i.e. the minimum scanning time is individually set for said layer portion in dependence on a layer portion specific quality parameter. The layer portion specific quality parameter may vary from layer portion to layer portion. Consequently, also the minimum scanning time may vary from layer portion to layer portion.

With increasing height of the work piece 18, heat dissipation from the work piece layer portions after scanning becomes more and more difficult. Thus, during the production of the work piece 18, a thermal gradient may develop within the work piece 18, i.e. layer portions in an upper part of the work piece 18 may not cool down as desired during the regular process of scanning the layer portion and applying a new raw material powder layer and top of the scanned layer portion. In the production of big volume parts made of maraging steel 1.2709 this may cause the problem that layer portions in an upper part of the work piece 18 do not sufficiently cool so as to allow the desired austenite/martensite transformation. In particular, the transformation from austenite to martensite does not take place if the layer portion does not cool below the austenite/martensite transformation temperature, i.e. does not cool below 200° C.

Consequently, work piece layer portions that do not undergo the austenite/martensite transformation during build-up of the work piece 18, only transform after the work piece 18 has been completed. This, however, may cause dimensional deviations over the height of the work piece 18. In particular, the volume change involved with the austenite/martensite transformation may cause an enlarged width of the work piece 18 in an upper part of the work piece 18 due to the inability of the material to expand in the vertical direction when the phase transformation happens only after the completion of the work piece 18.

In order to address this problem, in the apparatus 10 described herein, upon producing the work piece 18 from maraging steel 1.2709, a first layer portion specific quality parameter which is used by the control unit 26 for controlling the scanning time is indicative of a temperature of a respective layer portion at the end of the scanning time. In particular, the specific minimum value of the scanning time is set such that the respective layer portion has a desired crystallographic structure, namely a martensitic structure, at the end of the scanning time. In the exemplary embodiment described herein, this is achieved by ensuring that the temperature of the respective layer portion at the end of the scanning time does not exceed 200° C.

The first layer portion specific quality parameter and/or the minimum scanning time is/are determined, for a at least portion of at least some of the layers of the work piece to be produced, prior to starting the production of the three-dimensional work piece. Specifically, the first layer portion specific quality parameter, which is indicative of a temperature of a respective layer portion at the end of the scanning time, and the minimum scanning time are determined prior to starting the production of the three-dimensional work piece, for each layer portion, by means of a computer-aided simulation as shown in FIGS. 2a and b.

As becomes apparent from FIG. 2a, the temperature of the raw material powder/work piece layer portions at the end of an envisaged scanning time which results from the geometry of the work piece layer portions to be produced and the envisaged operating parameters of the irradiation device such as the scan speed, the spot size and the power of the irradiation beam increases with increasing vertical height of the work piece 18. In an upper part of the work piece 18 the temperatures rise up to 272° C. and thus well the above austenite/martensite transformation temperature of 200° C. Consequently, these work piece layer portions undergo the austenite/martensite transformation only after the work piece 18 has been completed. The volume change involved with the austenite/martensite transformation thus causes an enlarged width of the work piece 18 in an upper part of the work piece 18 as shown in FIG. 3a.

Figure 2B:
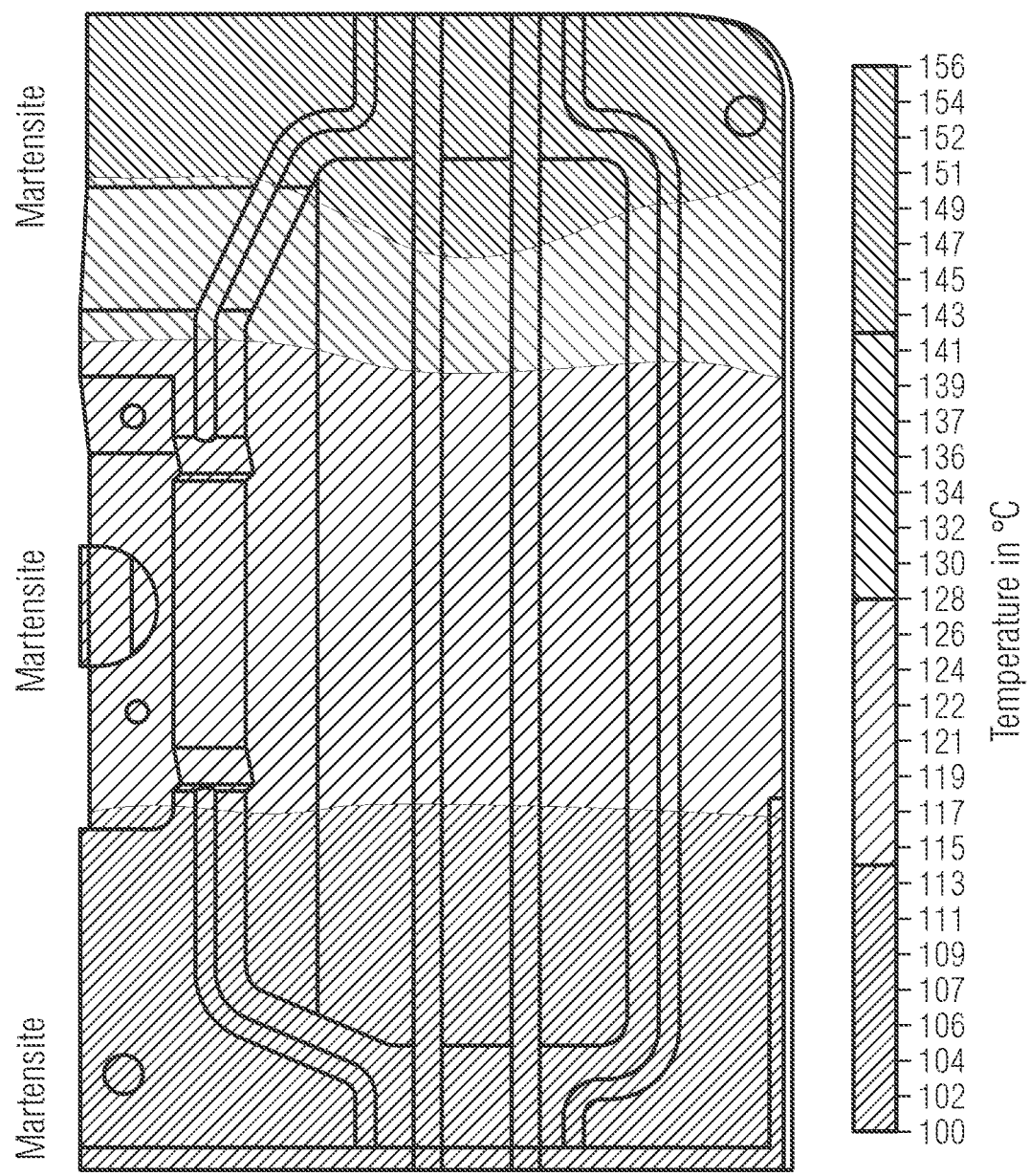
Figure 3B:
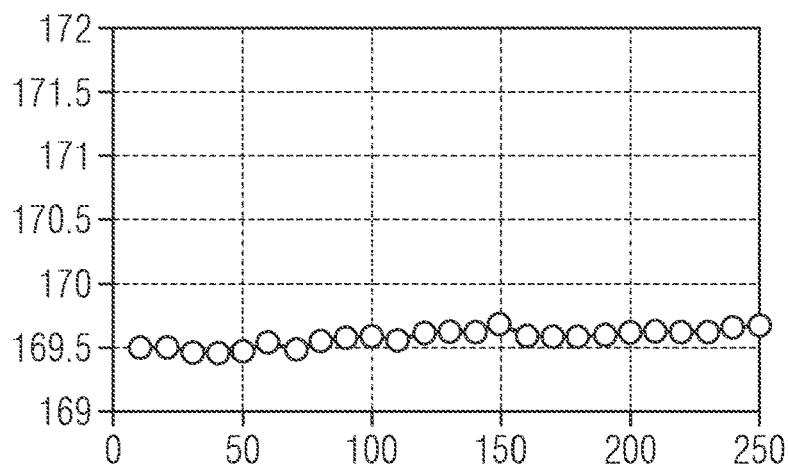

FIG. 2b shows the temperatures of the raw material powder/work piece layer portions at the end of a scanning time which, while taking into consideration the first layer portion specific quality parameter, is controlled so as to not fall below a layer portion specific minimum scanning time. If the scanning time is controlled so as to be long enough, the layer portions in the upper part of the work piece 18 have enough time to cool down to temperatures below 156° C. Consequently, each of the layer portions undergoes the austenite/martensite transformation already during the production of the work piece 18 allowing the volume change involved with the austenite/martensite transformation to take place in all directions (i.e. also in the vertical direction). A continuous width of the work piece 18 can thus can be achieved as shown in FIG. 3b.

In the exemplary embodiment described herein, wherein the minimum scanning time, upon taking into consideration the varying heat dissipation with increasing vertical height of the work piece 18 is determined such that the first layer portion specific quality parameter, i.e. the temperature of a raw material powder/work piece layer portion at the end of the scanning time, does not exceed 200° C., the control device 26 adapts the scanning time to the minimum scanning time by simply prolonging the waiting time while keeping the exposure time constant (for a work piece with constant exposure area). It is, however, also conceivable for the control device 26 to adapt, i.e. to both the exposure time and the waiting time in order to ensure that the scanning time does not fall below the minimum scanning time.

Further, while in the exemplary embodiment described herein, the layer portion specific quality parameter and the minimum scanning time are determined by means of a computer-aided simulation prior to starting the production of the work piece 18, it is also conceivable to determine the layer portion specific quality parameter and/or the minimum scanning time in situ during the production of the three-dimensional work piece. For example, the sensor device 28 may be used to measure the temperature of the raw material powder/work piece layer portions during production of the work piece 18, e.g. either resolved locally or with an average value over the area. The control device 26 then may determine a suitable minimum scanning time which ensures that the temperature does not exceed 200° C. and adapt the current scanning time accordingly.

In another exemplary embodiment, the layer portion specific quality parameter and/or the minimum scanning time are determined in situ during the production of the three-dimensional work piece by the control device 26 in a closed loop control manner. This means the control device 26 may prolong the minimum scanning time, e.g. by prolonging the waiting time, in intervals, determining the current temperature in every interval, and stopping the waiting time when the determined temperature falls below a predetermined threshold value, e.g. 200° C.

Quality issues in the work piece 18 to be produced may also result from abrupt changes in exposure area and hence exposure time in portions of adjacent layers as shown in the lower discontinuous curve of FIG. 4. Therefore, in the apparatus 10 described herein, upon producing the work piece 18, a second layer portion specific quality parameter which is used by the control unit 26 for controlling the scanning time is indicative of an abrupt exposure area change between at least a portion of a respective layer and at least a portion of an adjacent layer. The second layer portion specific quality parameter may easily be determined prior to the start of the production of the work piece 18 based on the geometry data of the work piece to be produced. Thus "critical" layer regions with layer portions showing abrupt exposure area changes and hence abrupt exposure time changes relative to at least portions of neighboring layers can easily be identified.

In order to avoid abrupt exposure area/exposure time changes between adjacent layer portions, the specific minimum value of the scanning time is set such that a difference in the scanning time between adjacent layer portions does not exceed a predetermined maximum value. This is in particular achieved by selecting a suitable exposure time while keeping the waiting time constant. Consequently, the control unit 26 controls the scanning time such that, in the "critical" layer region, the exposure time is continuously increased and continuously decreased instead of changed in in an abrupt manner as indicated by the upper continuous curve in FIG. 4.

The invention claimed is:

1. A method of operating an apparatus for producing a three-dimensional work piece by irradiating layers of a raw material powder with electromagnetic or particle radiation, the method comprising the steps:
   a) applying a layer of raw material powder onto a carrier;
   b) selectively irradiating the layer of raw material powder with electromagnetic or particle radiation in accordance with a geometry of a corresponding layer of the work piece to be produced; and
   c) repeating steps a) and b) until the work piece has reached a desired shape and size, wherein, for at least a layer portion of at least some of the layers,
   an exposure time being defined as a time period during which said layer portion is exposed to electromagnetic or particle radiation,
   a waiting time being defined as a time period during which said layer portion is not exposed to electromagnetic or particle radiation and while no new raw material powder layer on top of said layer portion is applied, and
   a raw material powder application time being defined as a time period during which a new raw material powder layer is applied on top of said layer portion,
   are controlled such that a scanning time from the beginning of an exposure of a respective raw material powder layer portion to electromagnetic or particle radiation until the beginning of an exposure of the new raw material powder layer applied on top of said layer portion to electromagnetic or particle radiation which is defined by the equation:

scanning time=the exposure time+the waiting time+ the raw material powder application time does not fall below a specific minimum value which is individually set for said layer portion in dependence on a layer portion specific quality parameter,
   wherein the layer portion specific quality parameter is indicative of a temperature of a respective layer portion at a predetermined time, such that the scanning time is controlled in dependence on the temperature of the respective layer portion at the predetermined time.

2. The method of claim 1, wherein the layer portion specific quality parameter and/or the corresponding minimum value for the scanning time is/are determined prior to starting production of the three-dimensional work piece and/or in situ during the production of the three-dimensional work piece.

3. The method of claim 1, wherein the specific minimum value of the scanning time is set such that at least a portion of the respective layer portion at the end of the scanning time does not exceed a predetermined maximum value.

4. The method of claim 1, wherein the specific minimum value of the scanning time is set such that at least a portion of the respective layer portion is cooled at a desired cooling rate and thus has a desired crystallographic structure at the end of the scanning time.

5. The method of claim 1, wherein the layer portion specific quality parameter is indicative of an exposure area change between at least a portion of a respective layer and at least a portion of an adjacent layer.

6. The method of claim 5, wherein the specific minimum value of the scanning time is set such that a difference in the scanning time between adjacent layer portions does not exceed a predetermined maximum value.

7. The method of claim 1, wherein the predetermined time is after the exposure time+waiting time or at the end of the scanning time.

8. A method of operating an apparatus for producing a three-dimensional work piece by irradiating layers of a raw material powder with electromagnetic or particle radiation, the method comprising the steps:
   a) applying a layer of raw material powder onto a carrier;
   b) selectively irradiating the layer of raw material powder with electromagnetic or particle radiation in accordance with a geometry of a corresponding layer of the work piece to be produced; and
   c) repeating steps a) and b) until the work piece has reached a desired shape and size,
   wherein, for at least a layer portion of at least some of the layers,
   an exposure time being defined as a time period during which said layer portion is exposed to electromagnetic or particle radiation,
   a waiting time being defined as a time period during which said layer portion is not exposed to electromagnetic or particle radiation and while no new raw material powder layer on top of said layer portion is applied, and
   a raw material powder application time being defined as a time period during which a new raw material powder layer is applied on top of said layer portion,
   are controlled such that a scanning time from the beginning of an exposure of a respective raw material powder layer portion to electromagnetic or particle radiation until the beginning of an exposure of the new raw material powder layer applied on top of said layer portion to electromagnetic or particle radiation which is defined by the equation:

scanning time=the exposure time+the waiting time+ the raw material powder application time does not fall below a specific minimum value which is individually set for said layer portion in dependence on a layer portion specific quality parameter,
   wherein the layer portion specific quality parameter is indicative of an exposure area change between at least a portion of a respective layer and at least a portion of an adjacent layer.

* * * * *